(12) United States Patent
Um (10) Patent No.: US 9,843,256 B2
(45) Date of Patent: Dec. 12, 2017

(54) INTERNAL VOLTAGE GENERATION CIRCUIT

(71) Applicant: SK hynix Inc., Gyeonggi-do (KR)

(72) Inventor: Ji-Yong Um, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 75 days.

(21) Appl. No.: 14/957,263

(22) Filed: Dec. 2, 2015

(65) Prior Publication Data

US 2017/0003703 A1 Jan. 5, 2017

(30) Foreign Application Priority Data

Jun. 30, 2015 (KR) ........................ 10-2015-0093127

(51) Int. Cl.
*H02M 3/07* (2006.01)
(52) U.S. Cl.
CPC ............. *H02M 3/07* (2013.01); *H02M 3/073* (2013.01)
(58) Field of Classification Search
None
See application file for complete search history.

(56) References Cited

U.S. PATENT DOCUMENTS

| | | | | |
|---|---|---|---|---|
| 7,123,078 B2 * | 10/2006 | Seo | ........................ | H02M 3/073 327/536 |
| 7,221,213 B2 * | 5/2007 | Lee | ........................ | G05F 1/571 323/280 |
| 7,667,529 B2 * | 2/2010 | Consuelo | ............... | G11C 5/145 327/156 |
| 7,928,796 B2 * | 4/2011 | Namekawa | ........... | H02M 3/073 327/114 |
| 7,944,277 B1 * | 5/2011 | Sinitsky | .................... | G05F 1/56 327/536 |
| 7,956,675 B2 * | 6/2011 | Saitoh | ................... | H02M 3/073 327/536 |
| 7,999,604 B2 * | 8/2011 | Jeong | ....................... | G01J 1/44 327/536 |
| 8,044,653 B2 * | 10/2011 | Maige | .................... | G05F 1/575 323/313 |
| 8,258,859 B2 * | 9/2012 | Jinbo | ...................... | G05F 1/565 327/540 |
| 8,674,765 B2 * | 3/2014 | Mengad | ............... | H03F 1/0211 330/255 |
| 9,281,744 B2 * | 3/2016 | Kropfitsch | ............ | H02M 3/073 |
| 2010/0033234 A1 * | 2/2010 | Lee | ........................ | G11C 5/143 327/536 |
| 2012/0230071 A1 * | 9/2012 | Kaneda | ................. | H02M 3/073 363/59 |

FOREIGN PATENT DOCUMENTS

| KR | 1020020090459 | 12/2002 |
|---|---|---|
| KR | 1020080106687 | 12/2008 |

* cited by examiner

*Primary Examiner* — Thomas J Hiltunen
(74) *Attorney, Agent, or Firm* — IP & T Group LLP (57) ABSTRACT

An internal voltage generation circuit includes a comparison block suitable for generating a comparison signal by comparing an internal voltage with a reference voltage; and an internal voltage generation circuit suitable for controlling an amount of an internal current in response to a bias voltage corresponding to an operation current of the comparison block, and generating the internal voltage corresponding to the internal current in response to the comparison signal.

9 Claims, 8 Drawing Sheets

INTERNAL VOLTAGE GENERATION CIRCUIT

CROSS-REFERENCE TO RELATED APPLICATIONS

The present application claims priority of Korean Patent Application No. 10-2015-0093127, filed on Jun. 30, 2015, which is incorporated herein by reference in its entirety.

BACKGROUND

1. Field

Exemplary embodiments of the present invention relate to a semiconductor design technology and, more particularly, to an internal voltage generation circuit.

2. Description of the Related Art

Semiconductor device operations require various internal voltages. The semiconductor device has voltage generators for generating the internal voltages. The semiconductor device may include a voltage generator for boosting a power supply voltage VDD that is supplied from an external device to generate a pumping voltage VPP having a voltage that is higher than the power supply voltage VDD. The voltage generator includes a DC/DC converter such as a charge-pump regulator.

One example of a semiconductor device that has a voltage generator is an image sensing device. Image sensing devices use the pumping voltage VPP in lieu of the power supply voltage VDD to improve operational reliability. For example, the image sensing device generates an operation control signal, which is used to transmit a photo-electric charge accumulated in a photodiode to a floating diffusion node, based on the pumping voltage VPP. When the photo-electric charge is transmitted to the floating diffusion node, the operational reliability of the image sensing device may be improved as the transmission capability is improved.

An image sensing device captures images using the photosensitive properties of semiconductors. Image sensing devices may be classified into charge coupled device (CCD) image sensors and complementary metal oxide semiconductor (CMOS) image sensors. The CMOS image sensors have come into widespread use as the CMOS image sensors allow analog circuits and digital control circuits to be directly implemented on a single integrated circuit (IC).

SUMMARY

Exemplary embodiments of the present invention are directed to an internal voltage generation circuit capable of indirectly monitoring ripples occurring in an internal voltage.

In accordance with an embodiment of the present invention, an internal voltage generation circuit may include a comparison block suitable for generating a comparison signal by comparing an internal voltage with a reference voltage; and an internal voltage generation block suitable for controlling an amount of an internal current in response to a bias voltage corresponding to an operation current of the comparison block, and generating the internal voltage corresponding to the internal current in response to the comparison signal.

The comparison block may include a division unit suitable for generating a division voltage by dividing the internal voltage at a predetermined division ratio; and a comparison unit suitable for generating the comparison signal by comparing the division voltage with the reference voltage.

The comparison unit may include a class AB operational amplifier.

The operation current includes at least one of a source current of the comparison block, and a sink current of the comparison block, which vary according to a voltage difference between the internal voltage and the reference voltage.

The internal voltage may include a pumping voltage.

The internal voltage generation block may include an oscillating signal generation unit operable in response to the comparison signal, and suitable for generating an oscillating signal whose frequency varies according to the bias voltage; and a pumping voltage generation unit suitable for generating the pumping voltage according to the oscillating signal.

The oscillating signal generation unit may include a current starved voltage controlled oscillator (VCO).

In accordance with another embodiment of the present invention, an internal voltage generation circuit may include a comparison block suitable for generating a comparison signal by comparing an internal voltage with a reference voltage; a first monitoring block suitable for generating a first monitoring signal by monitoring a first operation current of the comparison block; and an internal voltage generation block suitable for controlling an amount of an internal current in response to the first monitoring signal, and generating the internal voltage corresponding to the internal current in response to the comparison signal.

The internal voltage may include a pumping voltage.

The internal voltage generation block may include an oscillating signal generation unit operable in response to the comparison signal, and suitable for generating an oscillating signal whose frequency varies according to the first monitoring signal; and a pumping voltage generation unit suitable for generating the pumping voltage according to the oscillating signal and the first monitoring signal.

The oscillating signal generation unit may include a digitally controlled oscillator (DCO).

The pumping voltage generation unit may include a pumping capacity control unit suitable for controlling a pumping capacity of the pumping voltage generation unit in response to the first monitoring signal; and a pumping unit suitable for generating the pumping voltage corresponding to the pumping capacity and a frequency of the oscillating signal.

The comparison block may include a division unit suitable for generating a division voltage by dividing the internal voltage at a predetermined division ratio; and a comparison unit suitable for generating the comparison signal by comparing the division voltage with the reference voltage.

The comparison unit may include a class AB operational amplifier.

The first operation current may include a source current of the comparison block which varies according to a voltage difference between the internal voltage and the reference voltage.

The first monitoring block may include a pull-up mirroring unit suitable for generating a pull-up mirroring current by mirroring the first operation current; and a first monitoring unit suitable for generating the first monitoring signal according to the pull-up mirroring current.

The internal voltage generation circuit may further include a second monitoring block suitable for generating a second monitoring signal by monitoring a second operation current of the comparison block; and a discharge block suitable for discharging the internal current according to the second monitoring signal.

The second operation current may include a sink current of the comparison block which varies according to the voltage difference between the internal voltage and the reference voltage.

The second monitoring block may include a pull-down mirroring unit suitable for generating a pull-down mirroring current by mirroring the second operation current; a second monitoring unit suitable for generating a switching control signal according to the pull-down mirroring current; and a bias unit suitable for generating the second monitoring signal according to the switching control signal.

In accordance with another embodiment of the present invention, an internal voltage generation circuit may include an internal voltage generation block suitable for generating an internal voltage in response to a comparison signal; a comparison block suitable for generating the comparison signal by comparing the internal voltage with a reference voltage; a monitoring block suitable for generating a monitoring signal by monitoring an operation current of the comparison block; and a discharge block suitable for providing a discharge path between an output terminal of the internal voltage and a supply terminal of a low voltage according to the monitoring signal.

DETAILED DESCRIPTION

Exemplary embodiments of the present invention are described below in more detail with reference to the accompanying drawings. These embodiments are provided so that this disclosure is thorough and complete, and fully convey the scope of the present invention to those skilled in the art. All "embodiments" referred to in this disclosure refer to embodiments of the inventive concept disclosed herein. The embodiments presented are merely examples and are not intended to limit the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of one or more of the associated listed items. It is also noted that in this specification, "connected/coupled" refers to one component not only directly coupling another component but also indirectly coupling another component through an intermediate component.

In embodiments of the present invention, a pumping voltage generation circuit for generating a pumping voltage is described as an example of an internal voltage generation circuit.

Figure 1:
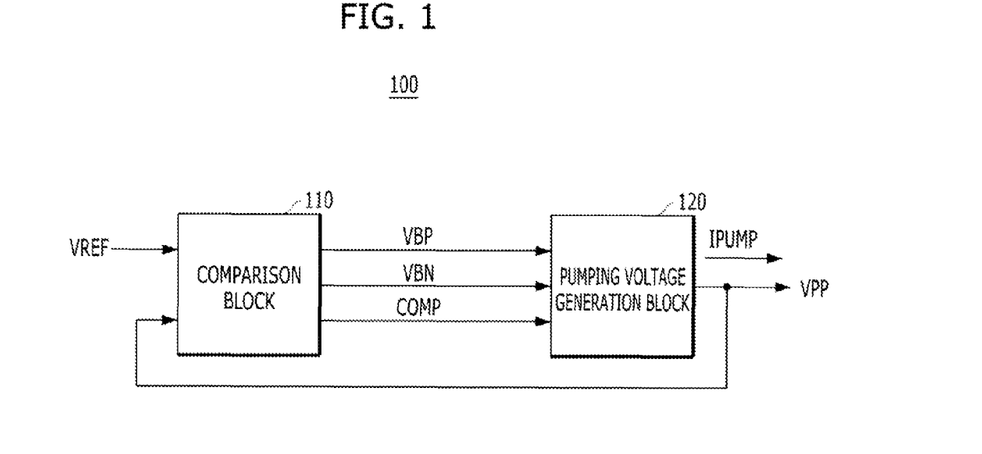
FIG. 1 is a block diagram illustrating an internal voltage generation circuit in accordance with an embodiment of the present invention.

FIG. 1 is a block diagram illustrating a pumping voltage generation circuit 100 in accordance with an embodiment of the present invention.

Referring to FIG. 1, the pumping voltage generation circuit 100 may include a comparison block 110 and a pumping voltage generation block 120.

The comparison block 110 may generate a comparison signal COMP by comparing a pumping voltage VPP with a reference voltage VREF. The comparison block 110 may generate a first bias voltage VBP and a second bias voltage VBN corresponding to a first operation current IP and a second operation current IN, respectively, that are internally generated during the comparison operation of the comparison block 110.

The pumping voltage generation block 120 may control the amount of a pumping current IPUMP and generate the pumping voltage VPP corresponding to the pumping current IPUMP in response to the first bias voltage VBP, the second bias voltage VBN and the comparison signal COMP. The pumping current IPUMP may correspond to the amount of a pumping charge that is pumped by the pumping voltage generation block 120.

Figure 2:
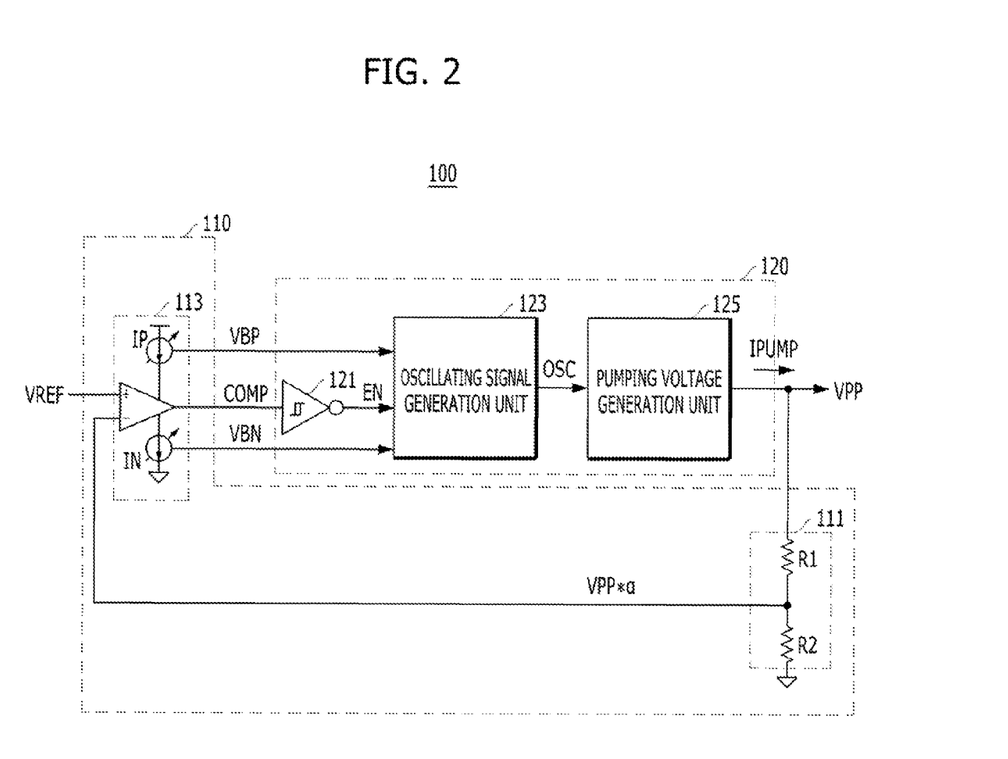
FIG. 2 is a block diagram illustrating a comparison block and a pumping voltage generation block.

FIG. 2 is a block diagram illustrating the comparison block 110 and the pumping voltage generation block 120 shown in FIG. 1.

Referring to FIG. 2, the comparison block 110 may include a division unit 111 and a comparison unit 113.

The division unit 111 may divide the pumping voltage VPP at a predetermined division ratio "α" to generate a division voltage VPP*α. The division ratio "α" may be determined based on a resistance value R1 of first resistance and a resistance value R2 of second resistance included in the division unit 111. For example, the division ratio "α" may be "R2/(R1+R2)".

The comparison unit 113 may generate the comparison signal COMP by comparing the division voltage VPP*α with the reference voltage VREF. For example, the comparison unit 113 may include a class AB operational amplifier. The class AB operational amplifier may have the characteristics such that the first operation current IP and the second operation current IN vary according to a voltage difference between the division voltage VPP*α and the reference voltage VREF.

The pumping voltage generation block 120 may include an enablement unit 121, an oscillating signal generation unit 123 and a pumping voltage generation unit 125.

The enablement unit 121 may generate an enablement signal EN based on the comparison signal COMP. For example, the enablement unit 121 may include the schmitt trigger inverter.

The oscillating signal generation unit 123 may be enabled in response to the enablement signal EN and generate an oscillating signal OSC with a frequency that varies according to the first bias voltage VBP and the second bias voltage VBN. For example, the oscillating signal generation unit 123 may include a current starved voltage controlled oscillator (VCO). Although not illustrated, the current starved VCO may generate a first mirrored current and a second mirrored current by mirroring the first operation current IP and the second operation current IN based on the first bias voltage VBP and the second bias voltage VBN, and control the frequency of the oscillating signal OSC based on the first mirrored current and the second mirrored current. For example, the current starved VCO may generate the oscillating signal OSC having a higher frequency as the first mirrored current and the second mirrored current are greater.

The pumping voltage generation unit 125 may generate the pumping voltage VPP in response to the oscillating signal OSC. Particularly, the pumping voltage generation unit 125 may control the amount of the pumping current IPUMP by controlling the amount of the pumping charge based on the frequency of the oscillating signal OSC.

Figure 3:
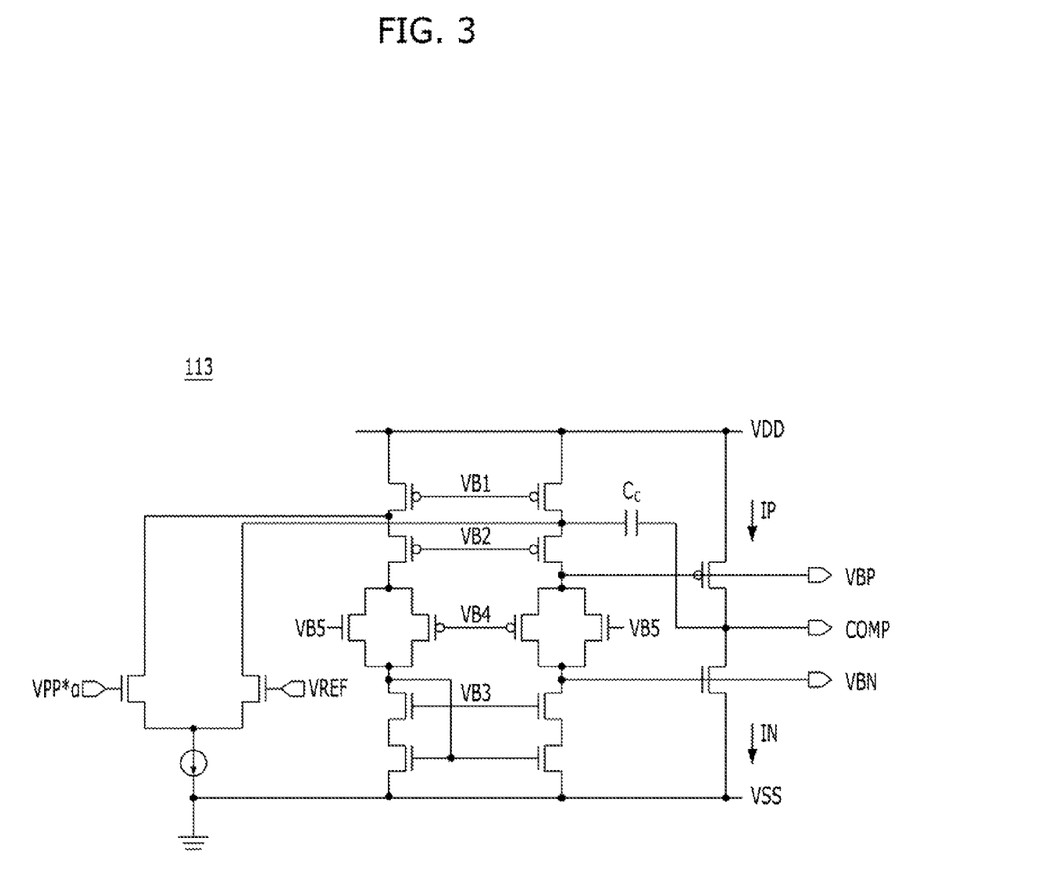
FIG. 3 is a circuit diagram illustrating a comparison unit.

FIG. 3 is a circuit diagram illustrating the comparison unit 113 shown in FIG. 2.

Referring to FIG. 3, the comparison unit 113 may include the class AB operational amplifier. Since the class AB operational amplifier is widely known to those skilled in the art, a detailed description thereof is omitted.

The first operation current IP may be a source current that flows through a PMOS transistor coupled between a power supply voltage VDD terminal and an output terminal of the comparison signal COMP. The PMOS transistor may receive the first bias voltage VBP at its gate. When the reference voltage VREF is greater than the division voltage VPP*α, the first operation current IP may increase in proportion to the voltage difference therebetween. When the reference voltage VREF is greater than the division voltage VPP*α, the pumping voltage VPP may drop as a load current IL surges.

The second operation current IN may be a sink current that flows through an NMOS transistor coupled between the output terminal of the comparison signal COMP and a ground voltage VSS terminal. The NMOS transistor may receive the second bias voltage VBN at its gate. When the division voltage VPP*α is greater than the reference voltage VREF, the second operation current IN may increase in proportion to the voltage difference therebetween. When the division voltage VPP*α is greater than the reference voltage VREF, the pumping voltage VPP may excessively increase as the load current IL surges and then diminishes.

In accordance with the embodiment of the present invention, the pumping voltage VPP may be indirectly monitored through monitoring of the first operation current IP and the second operation current IN. Therefore, the pumping voltage generation circuit 100 may be insensitive to high-frequency noise included in the pumping voltage VPP. Since the class AB operational amplifier has a low-pass filter characteristic, an amplification operation may be performed while the component of the high-frequency noise is removed. Therefore, the first operation current IP and the second operation current IN may be unaffected by the high-frequency noise.

Figure 4:
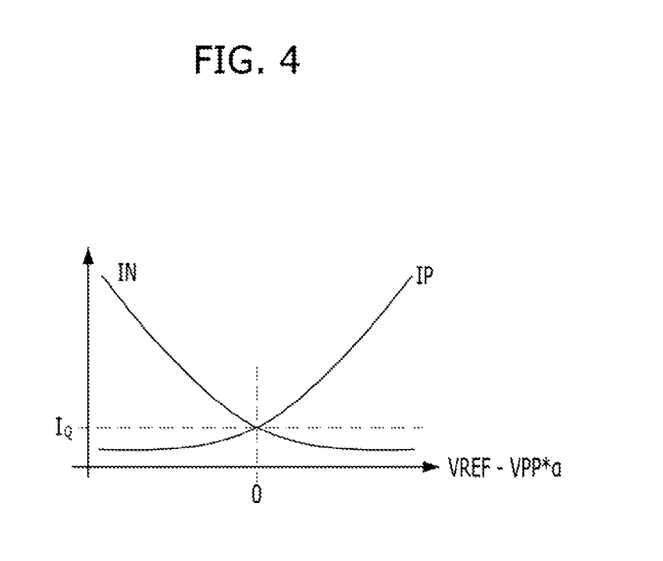
FIG. 4 is a graph of characteristic curves of a first operation current and a second operation current.

FIG. 4 is a graph of characteristic curves of the first operation current IP and the second operation current IN based on the voltage difference between the reference voltage VREF and the division voltage VPP*α.

Referring to FIG. 4, as described above, the first operation current IP may increase in proportion to the voltage difference when the reference voltage VREF is greater than the division voltage VPP*α, and the second operation current IN may increase in proportion to the voltage difference when the division voltage VPP*α is greater than the reference voltage VREF.

Hereinafter, operations of the pumping voltage generation circuit 100 having the aforementioned structure are described with reference to FIG. 5.

Figure 5:
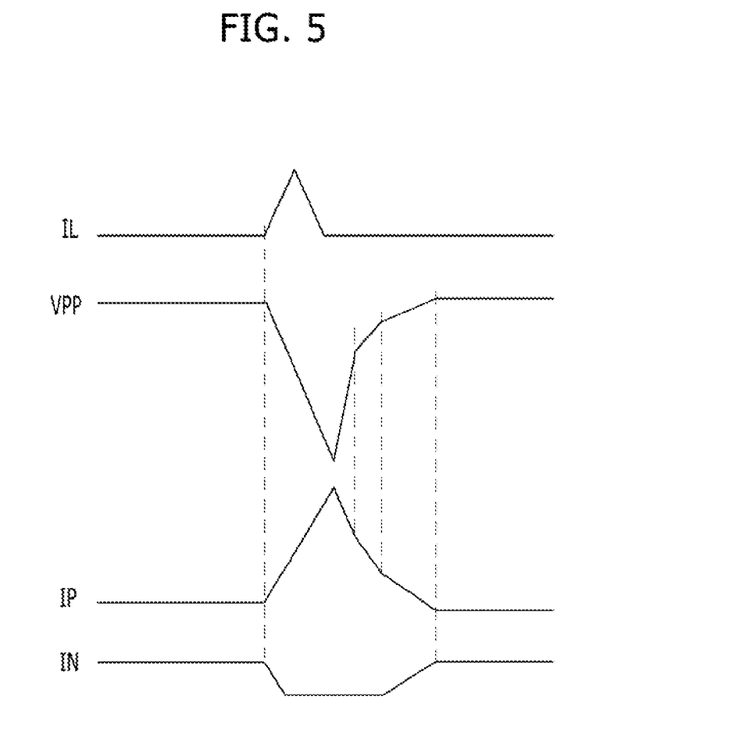
FIG. 5 is a timing diagram illustrating operations of the internal voltage generation circuit.

FIG. 5 is a timing diagram illustrating the operations of the pumping voltage generation circuit 100 shown in FIG. 1.

Referring to FIG. 5, the pumping voltage VPP may drop as the load current IL surges. In other words, when the load current IL surges, a ripple may occur in the pumping voltage VPP. As the load current IL surges more greatly, a greater ripple may occur in the pumping voltage VPP. In this case, the pumping voltage generation circuit 100 may remove the ripple as follows.

The comparison block 110 may compare the pumping voltage VPP with the reference voltage VREF and generate the comparison signal COMP corresponding to the comparison result. For example, the division unit 111 may divide the pumping voltage VPP at the predetermined division ratio "α" to generate the division voltage VPP*α whose voltage level drops below the pumping voltage VPP, and the comparison unit 113 may compare the division voltage VPP*α with the reference voltage VREF to generate the comparison signal COMP.

Since the comparison unit 113 may be implemented as the class AB operational amplifier, the first operation current IP and the second operation current IN flowing in the comparison unit 113 may vary in a manner corresponding to the voltage difference between the division voltage VPP*α and the reference voltage VREF. When the reference voltage VREF is greater than the division voltage VPP*α, the first operation current IP may increase in proportion to the voltage difference between the reference voltage VREF and the division voltage VPP*α, and the second operation current IN may decrease in proportion to the voltage difference between the reference voltage VREF and the division voltage VPP*α.

The pumping voltage generation block 120 may generate the pumping voltage VPP based on the first bias voltage VBP corresponding to the first operation current IP and the second bias voltage VBN corresponding to the second operation current IN.

For example, the enablement unit 121 may generate the enablement signal EN by stabilizing waveforms of the comparison signal COMP. The oscillating signal generation unit 123 may generate the oscillating signal OSC having a frequency corresponding to the first operation current IP and the second operation current IN in response to the enablement signal EN, the first bias voltage VBP and the second bias voltage VBN. The pumping voltage generation unit 125 may supply the pumping charge to a pumping voltage VPP terminal in response to the oscillating signal OSC. The amount of the pumping charge may be adaptively controlled based on the frequency of the oscillating signal OSC.

In accordance with an embodiment of the present invention, the pumping voltage generation circuit 100 may remove the ripple voltage occurring in the pumping voltage VPP as the amount of the pumping charge is adaptively controlled based on the load current IL. Particularly, as the load current IL is indirectly monitored based on the first operation current IP and the second operation current IN, monitoring accuracy may be improved because the pumping voltage generation circuit 100 does not fall under the influence of the high-frequency noise component of the pumping voltage VPP.

Figure 6:
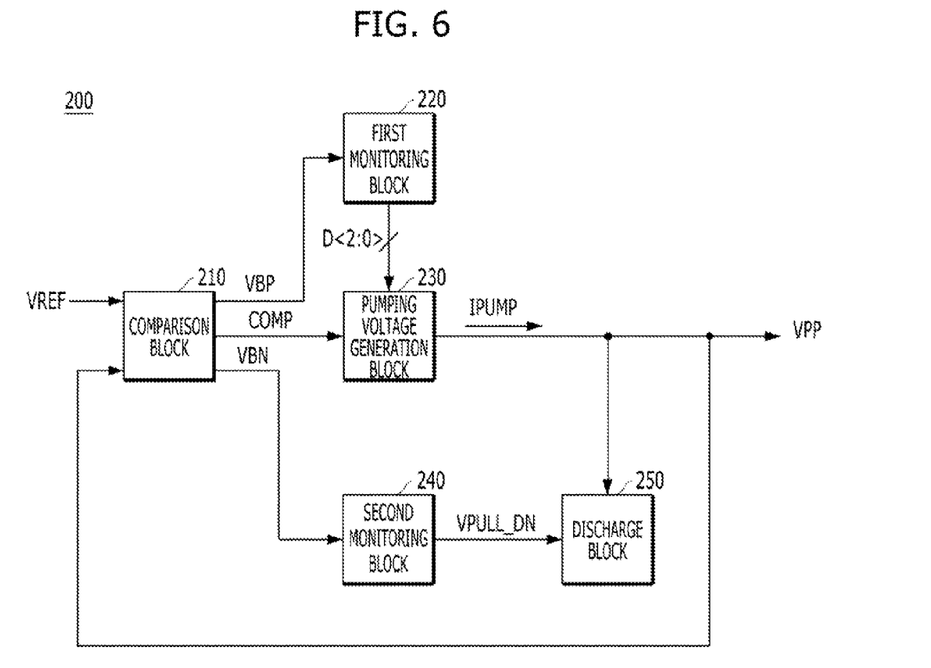
FIG. 6 is a block diagram illustrating an internal voltage generation circuit in accordance with another embodiment of the present invention.

FIG. 6 is a block diagram illustrating a pumping voltage generation circuit 200 in accordance with another embodiment of the present invention.

Referring to FIG. 6, the pumping voltage generation circuit 200 may include a comparison block 210, a first monitoring block 220, a pumping voltage generation block 230, a second monitoring block 240, and a discharge block 250.

The comparison block 210 may generate a comparison signal COMP by comparing a pumping voltage VPP with a reference voltage VREF. The comparison block 210 may generate a first bias voltage VBP and a second bias voltage VBN corresponding to a first operation current IP and a second operation current IN, respectively, that are internally generated during the comparison operation of the comparison block 210.

The first monitoring block 220 may monitor the first operation current IP based on the first bias voltage VBP, and generate first monitoring signals D<2:0> corresponding to the monitoring result. For example, the first monitoring block 220 may indirectly monitor whether and by how much the pumping voltage VPP drops by monitoring the first operation current IP.

The pumping voltage generation block 230 may control the amount of a pumping current IPUMP in response to the first monitoring signals D<2:0>, and generate the pumping voltage VPP corresponding to the pumping current IPUMP in response to the comparison signal COMP. The pumping current IPUMP may correspond to the amount of a pumping charge that is pumped by the pumping voltage generation block 230.

The second monitoring block 240 may monitor the second operation current IN based on the second bias voltage VBN, and generate a second monitoring signal VPULL_DN corresponding to the monitoring result. For example, the second monitoring block 240 may indirectly monitor whether and by how much the pumping voltage VPP rises by monitoring the second operation current IN.

The discharge block 250 may discharge the pumping current IPUMP in response to the second monitoring signal VPULL_DN.

Figure 7:
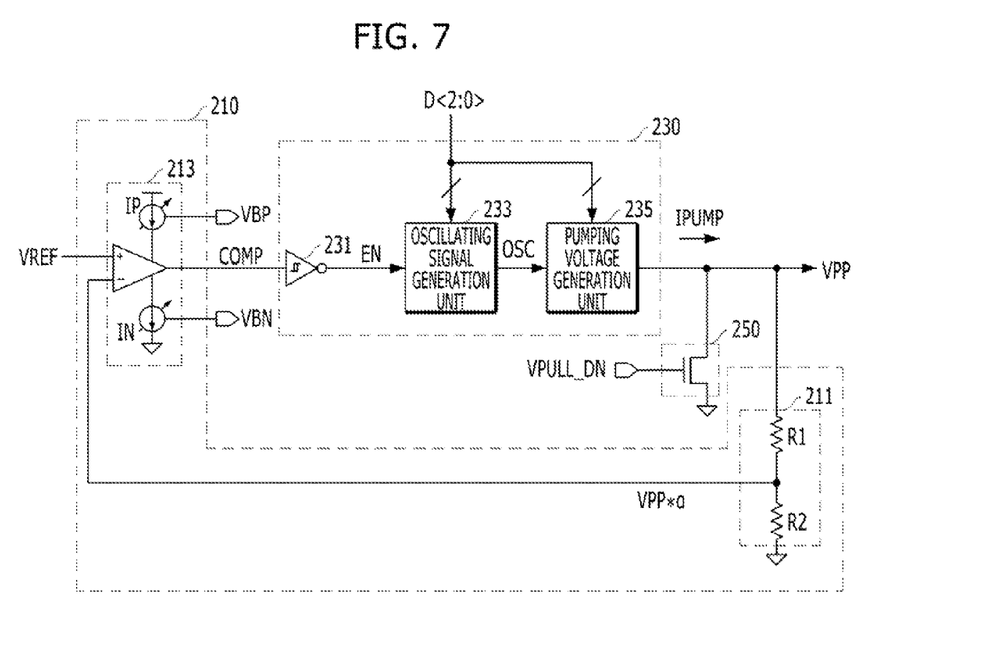
FIG. 7 is a circuit diagram illustrating a comparison block, a pumping voltage generation block and a discharge block.

FIG. 7 is a circuit diagram illustrating the comparison block 210, the pumping voltage generation block 230 and the discharge block 250 shown in FIG. 6.

Referring to FIG. 7, the comparison block 210 may include a division unit 211 and a comparison unit 213.

The division unit 211 may divide the pumping voltage VPP at a predetermined division ratio "α" to generate a division voltage VPP*α. The division ratio "α" may be determined based on a resistance value R1 of first resistance and a resistance value R2 of second resistance included in the division unit 211. For example, the division ratio "α" may be R2/(R1+R2).

The comparison unit 213 may generate the comparison signal COMP by comparing the division voltage VPP*α with the reference voltage VREF. For example, the comparison unit 213 may include a class AB operational amplifier. The class AB operational amplifier may have the characteristics where the first operation current IP and the second operation current IN vary according to a voltage difference between the division voltage VPP*α and the reference voltage VREF.

The pumping voltage generation block 230 may include an enablement unit 231, an oscillating signal generation unit 233 and a pumping voltage generation unit 235.

The enablement unit 231 may generate an enablement signal EN based on the comparison signal COMP. For example, the enablement unit 231 may include the schmitt trigger inverter.

The oscillating signal generation unit 233 may be enabled in response to the enablement signal EN and generate an oscillating signal OSC whose frequency varies according to the first monitoring signals D<2:0>. For example, the oscillating signal generation unit 233 may include a digitally controlled oscillator (DCO).

The pumping voltage generation unit 235 may control a pumping capacity in response to the first monitoring signals D<2:0> and generate the pumping voltage VPP in response to the oscillating signal OSC provided from the oscillating signal generation unit 233. Particularly, the pumping voltage generation unit 235 may control the amount of the pumping current IPUMP by controlling the amount of the pumping charge based on the frequency of the oscillating signal OSC and the pumping capacity.

The discharge block 250 may provide a discharge path between a pumping voltage VPP terminal and a ground voltage VSS terminal in response to the second monitoring signal VPULL_DN. For example, the discharge block 250 may include an NMOS transistor having a gate coupled to an input terminal where the second monitoring signal VPULL_DN is inputted, and a source and a drain coupled between the pumping voltage VPP terminal and the ground voltage VSS terminal.

Figure 8:
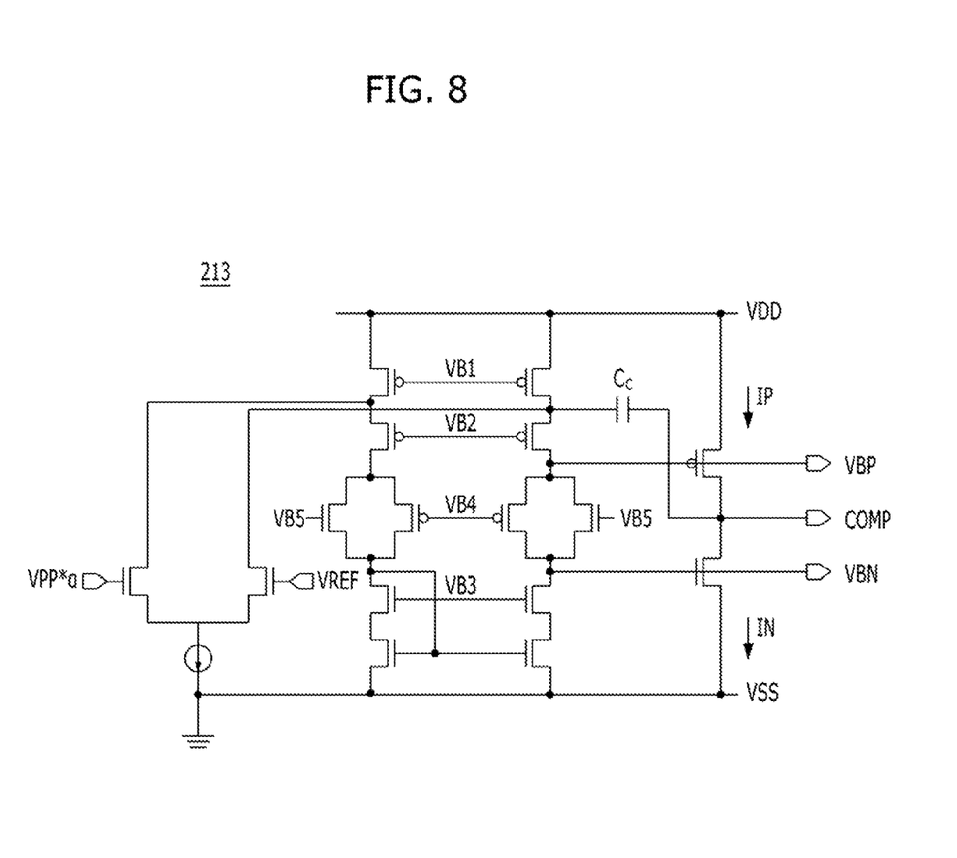
FIG. 8 is a circuit diagram illustrating a comparison unit.
Figure 9:
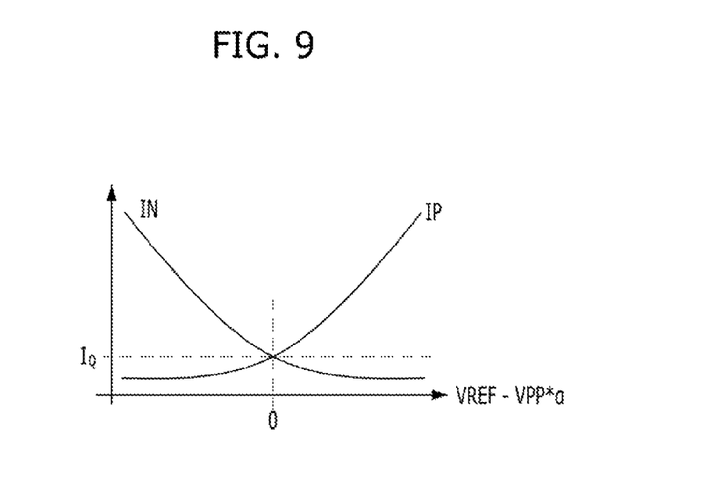
FIG. 9 is a graph of characteristic curves of a first operation current and a second operation current.

FIG. 8 is a circuit diagram illustrating the comparison unit 213 shown in FIG. 7. FIG. 9 is a graph of characteristic curves of the first operation current IP and the second operation current IN of the comparison unit 213 shown in FIG. 8.

The comparison unit 213 of FIGS. 7 to 8 may be similar to the comparison unit 113 of FIGS. 2 to 4.

Figure 10:
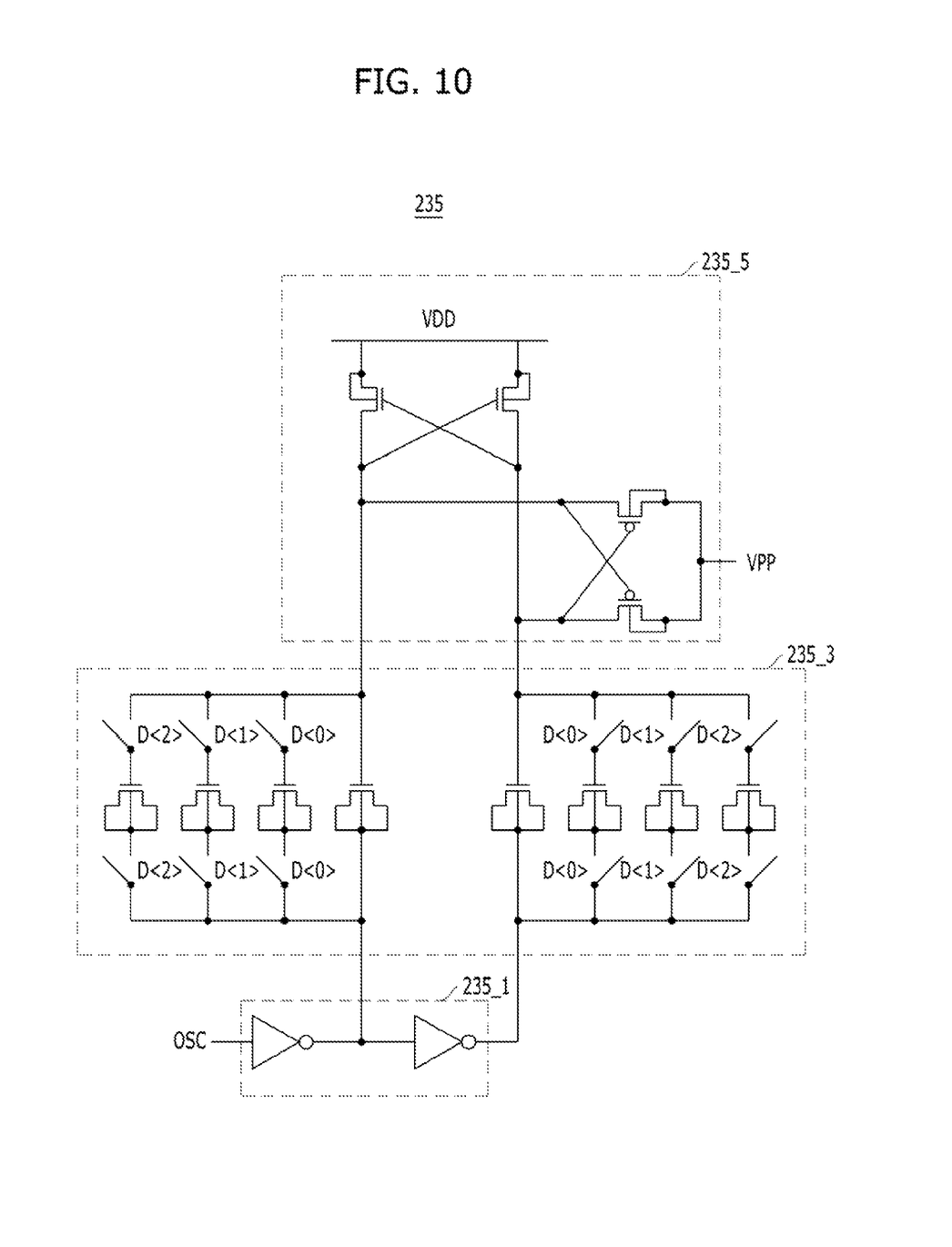
FIG. 10 is a circuit diagram illustrating a pumping voltage generation unit.

FIG. 10 is a circuit diagram illustrating the pumping voltage generation unit 235 shown in FIG. 7.

Referring to FIG. 10, the pumping voltage generation unit 235 may include an input unit 235_1, a pumping capacity control unit 235_3 and a pumping unit 235_5.

The input unit 235_1 may invert and non-invert the oscillating signal OSC.

The pumping capacity control unit 235_3 may control the pumping capacity in response to the first monitoring signals D<2:0>. For example, the pumping capacity control unit 235_3 may include a plurality of pumping capacitors and a plurality of switches for coupling the pumping capacitors in parallel in response to the first monitoring signals D<2:0>. The pumping capacity control unit 235_3 may control the pumping capacity by controlling the number of the pumping capacitors in response to the first monitoring signals D<2:0>.

The pumping unit 235_5 may generate the pumping voltage VPP corresponding to the pumping capacity and the frequency of the oscillating signal OSC.

Figure 11:
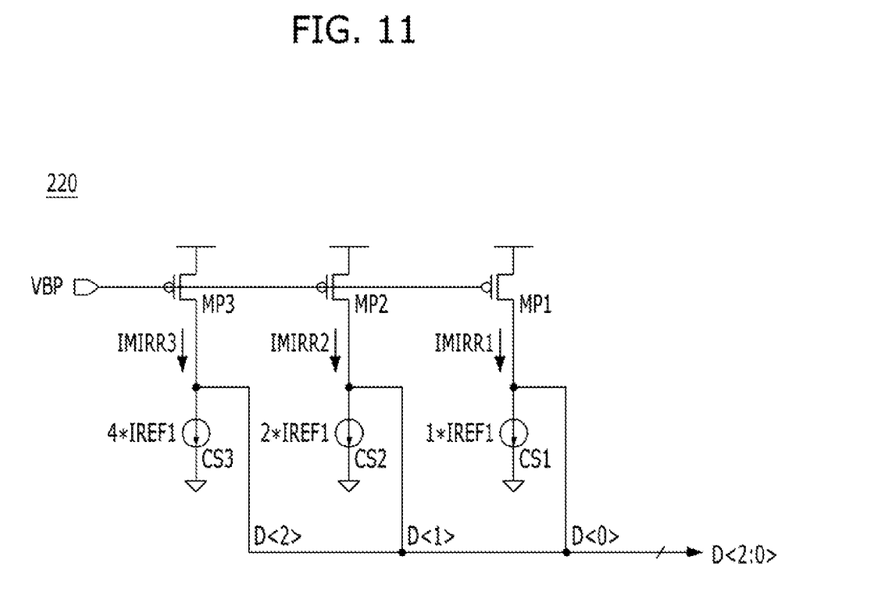
FIG. 11 is a circuit diagram illustrating a monitoring block.

FIG. 11 is a circuit diagram illustrating the first monitoring block 220 shown in FIG. 6.

Although it is described in the embodiment of the present invention that the first monitoring signals D<2:0> outputted from the first monitoring block 220 includes a 3-bit signal (e.g., a first monitoring bit signal D<0>, a second monitoring bit signal D<1> and a third monitoring bit signal D<2>), the inventive concept is not limited to this. Hereinafter, the first monitoring signals D<2:0> are referred to as the first to third monitoring bit signals D<2:0>.

Referring to FIG. 11, the first monitoring block 220 may include first to third pull-up mirroring units MP1, MP2 and MP3 and first to third monitoring units CS1, CS2 and CS3.

The first to third pull-up mirroring units MP1, MP2 and MP3 may generate first to third pull-up mirroring currents IMIRR1, IMIRR2 and IMIRR3 by mirroring the first operation current IP based on the first bias voltage VBP. The first to third pull-up mirroring currents IMIRR1, IMIRR2 and IMIRR3 may have the same amount of current.

For example, the first pull-up mirroring unit MP1 may include a first PMOS transistor having a gate coupled to an input terminal where the first bias voltage VBP is inputted, and a source and a drain coupled between a power source voltage VDD terminal and an output terminal of the first monitoring bit signal D<0>. The second pull-up mirroring unit MP2 may include a second PMOS transistor having a gate coupled to an input terminal where the first bias voltage VBP is inputted, and a source and a drain coupled between the power source voltage VDD terminal and an output terminal of the second monitoring bit signal D<1>. The third pull-up mirroring unit MP3 may include a third PMOS transistor having a gate coupled to an input terminal where the first bias voltage VBP is inputted, and a source and a drain coupled between the power source voltage VDD terminal and an output terminal of the third monitoring bit signal D<2>.

The first to third monitoring units CS1, CS2 and CS3 may generate the first to third monitoring bit signals D<2:0> by comparing the first to third pull-up mirroring currents IMIRR1, IMIRR2 and IMIRR3 with first to third set currents 1*IREF, 2*IREF and 4*IREF. In other words, the first monitoring unit CS1 may generate the first monitoring bit signal D<0> corresponding to a power source voltage when the first pull-up mirroring current IMIRR1 is greater than the first set current 1*IREF, and the first monitoring bit signal D<0> corresponding to a ground voltage when the first pull-up mirroring current IMIRR1 is less than the first set current 1*IREF. The second monitoring unit CS2 may generate the second monitoring bit signal D<1> corresponding to the power source voltage when the second pull-up mirroring current IMIRR2 is greater than the second set current 2*IREF, and the second monitoring bit signal D<1> corresponding to the ground voltage when the second pull-up mirroring current IMIRR2 is less than the second set current 2*IREF. The third monitoring unit CS3 may generate the third monitoring bit signal D<2> corresponding to the power source voltage when the third pull-up mirroring current IMIRR3 is greater than the third set current 4*IREF, and the third monitoring bit signal D<2> corresponding to the ground voltage when the third pull-up mirroring current IMIRR3 is less than the third set current 4*IREF. The first to third set currents 1*IREF, 2*IREF and 4*IREF may have different amounts of current.

The first monitoring unit CS1 may include a first current source coupled between the output terminal of the first monitoring bit signal D<0> and the ground voltage VSS terminal. The second monitoring unit CS2 may include a second current source coupled between the output terminal of the second monitoring bit signal D<1> and the ground voltage VSS terminal. The third monitoring unit CS3 may include a third current source coupled between the output terminal of the third monitoring bit signal D<2> and the ground voltage VSS terminal.

Figure 12:
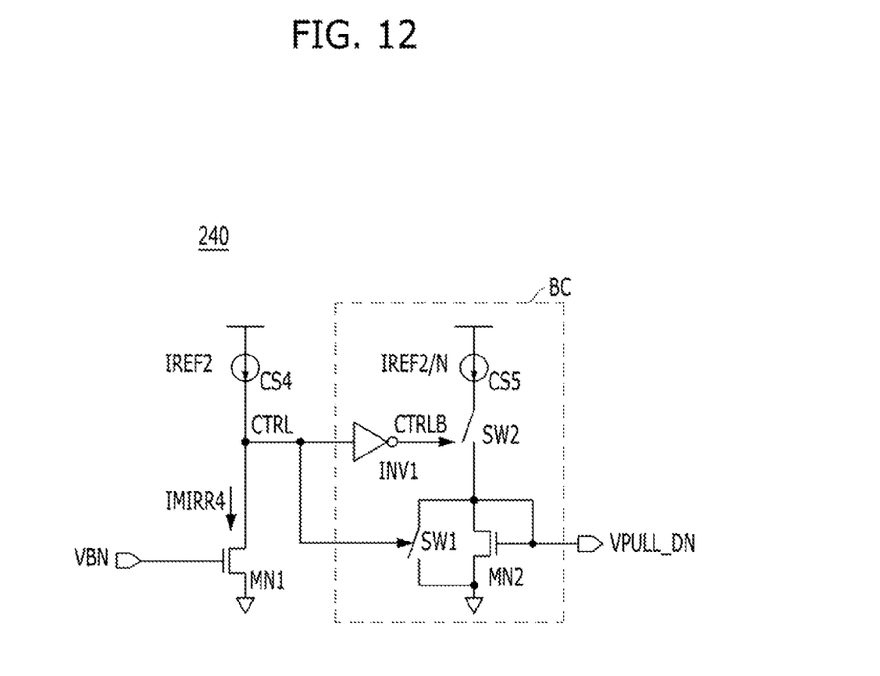
FIG. 12 is a circuit diagram illustrating a monitoring block.

FIG. 12 is a circuit diagram illustrating the second monitoring block 240 shown in FIG. 6.

Referring to FIG. 12, the second monitoring block 240 may include a pull-down mirroring unit MN1, a fourth monitoring unit CS4 and a bias unit BC.

The pull-down mirroring unit MN1 may generate a pull-down mirroring current IMIRR4 by mirroring the second operation current IN based on the second bias voltage VBN. For example, the pull-down mirroring unit MN1 may include a first NMOS transistor having a gate coupled to an input terminal where the second bias voltage VBN is inputted, and a drain and a source coupled between an output terminal of a switching control signal CTRL and the ground voltage VSS terminal.

The fourth monitoring unit CS4 may generate the switching control signal CTRL corresponding to the pull-down mirroring current IMIRR4 by comparing the pull-down mirroring current IMIRR4 with a fourth set current IREF2. In other words, the fourth monitoring unit CS4 may generate the switching control signal CTRL corresponding to the ground voltage when the pull-down mirroring current IMIRR4 is greater than the fourth set current IREF2, and the switching control signal CTRL corresponding to the power source voltage when the pull-down mirroring current IMIRR4 is less than the fourth set current IREF2. For example, the fourth monitoring unit CS4 may include a fourth current source coupled between the power source voltage VDD terminal and the output terminal of the switching control signal CTRL.

The bias unit BC may generate a bias voltage corresponding to a fifth set current IREF2/N or the ground voltage as the second monitoring signal VPULL_DN in response to the switching control signal CTRL. For example, the bias unit BC may include a first switch SW1, an inverter INV1, a fifth current source CS5, a second switch SW2 and a diode connected NMOS transistor MN2. The first switch SW1 may couple an output terminal of the second monitoring signal VPULL_DN to the ground voltage terminal in response to the switching control signal CTRL. The inverter INV1 may generate an inverted switching control signal CTRLB by inverting the switching control signal CTRL. The fifth current source CS5 may supply the fifth set current IREF2/N to the output terminal of the second monitoring signal VPULL_DN. The second switch SW2 may couple the fifth current source CS5 to the output terminal of the second monitoring signal VPULL_DN in response to the inverted switching control signal CTRLB. The diode connected NMOS transistor MN2 may include a gate coupled to an output terminal where the second monitoring signal VPULL_DN is outputted, and a drain and a source coupled between the second switch SW2 and the ground voltage VSS terminal.

Hereinafter, operations of the pumping voltage generation circuit 200 having the aforementioned structure are described with reference to FIG. 13.

Figure 13:
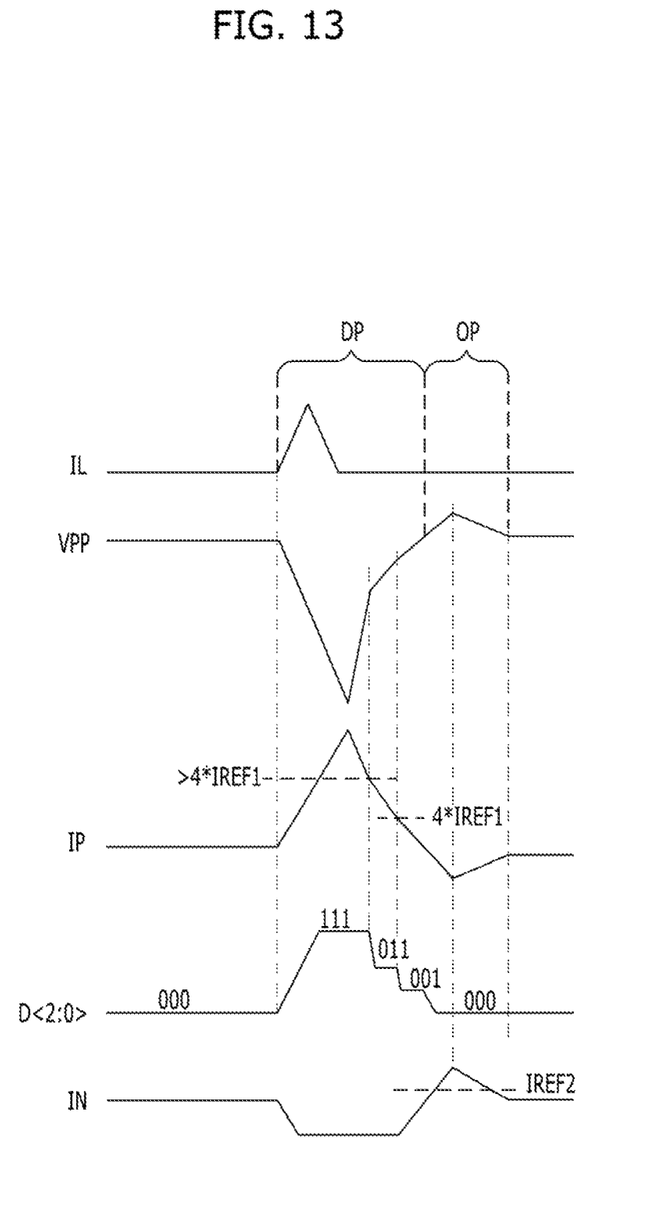
FIG. 13 is a timing diagram illustrating operations of the internal voltage generation circuit.

FIG. 13 is a timing diagram illustrating operations of the pumping voltage generation circuit 200 shown in FIG. 6. FIG. 13 exemplarily illustrates the operation of the pumping voltage generation circuit 200 when the pumping voltage VPP drops below a target level (DP), and the operation of the pumping voltage generation circuit 200 when the pumping voltage VPP rises above the target level (OP).

First, the operation of the pumping voltage generation circuit 200 when the pumping voltage VPP drops below the target level (DP) is described below.

Referring to FIG. 13, the pumping voltage VPP may drop as a load current IL surges. In other words, when the load current IL surges, a ripple may occur in the pumping voltage VPP. As the load current IL surges more greatly, a greater ripple may occur in the pumping voltage VPP. In this case, the pumping voltage generation circuit 200 may remove the ripple as follows.

The comparison block 210 may compare the pumping voltage VPP with the reference voltage VREF and generate the comparison signal COMP corresponding to the comparison result. For example, the division unit 211 may divide the pumping voltage VPP at the predetermined division ratio "α" to generate the division voltage VPP*α whose voltage level drops below the pumping voltage VPP, and the comparison unit 213 may compare the division voltage VPP*α with the reference voltage VREF to generate the comparison signal COMP.

Since the comparison unit 213 may be implemented as the class AB operational amplifier, the first operation current IP flowing in the comparison unit 213 may vary corresponding to the voltage difference between the division voltage VPP*α and the reference voltage VREF. For example, the first operation current IP may increase in proportion to the voltage difference between the division voltage VPP*α and the reference voltage VREF.

The first monitoring block 220 may generate the first to third monitoring bit signals D<2:0> based on the first bias voltage VBP corresponding to the first operation current IP. For example, the first to third pull-up mirroring units MP1, MP2 and MP3 may generate first to third pull-up mirroring currents IMIRR1, IMIRR2 and IMIRR3 by mirroring the first operation current IP based on the first bias voltage VBP, and the first to third monitoring units CS1, CS2 and CS3 may generate the first to third monitoring bit signals D<2:0> by comparing the first to third pull-up mirroring currents IMIRR1, IMIRR2 and IMIRR3 with first to third set currents 1*IREF, 2*IREF and 4*IREF.

The first to third pull-up mirroring currents IMIRR1, IMIRR2 and IMIRR3 may have the same amount of current, and the first to third set currents 1*IREF, 2*IREF and 4*IREF may have different amounts of current. Therefore, a logic level of the first monitoring bit signal D<0> may be defined based on a current size relationship between the first pull-up mirroring current IMIRR1 and the first set current 1*IREF, a logic level of the second monitoring bit signal D<1> may be defined based on a current size relationship between the second pull-up mirroring current IMIRR2 and the second set current 2*IREF, and a logic level of the third monitoring bit signal D<2> may be defined based on a current size relationship between the third pull-up mirroring current IMIRR3 and the third set current 4*IREF.

When the first to third pull-up mirroring currents IMIRR1, IMIRR2 and IMIRR3 have the amount of current greater than the third set current 4*IREF, the first to third monitoring bit signals D<2:0> may have a logic level of "1, 1, 1". When the first to third pull-up mirroring currents IMIRR1, IMIRR2 and IMIRR3 have the amount of current between the second set current 2*IREF and the third set current 4*IREF, the first to third monitoring bit signals D<2:0> may have a logic level of "0, 0, 1". When the first to third pull-up mirroring currents IMIRR1, IMIRR2 and IMIRR3 have the amount of current less than the first set current 1*IREF, the first to third monitoring bit signals D<2:0> may have a logic level of "0, 0, 0".

The pumping voltage generation block 230 may generate the pumping voltage VPP in response to the comparison signal COMP and the first to third monitoring bit signals D<2:0>.

For example, the enablement unit 231 may generate the enablement signal EN by stabilizing waveforms of the comparison signal COMP. The oscillating signal generation unit 233 may generate the oscillating signal OSC having a frequency corresponding to the first operation current IP in response to the enablement signal EN and the first to third monitoring bit signals D<2:0>. The pumping voltage generation unit 235 may control the pumping capacity in response to the first to third monitoring bit signals D<2:0> and supply the pumping charge to the pumping voltage VPP terminal in response to the oscillating signal OSC. The amount of the pumping charge may be adaptively controlled based on the frequency of the oscillating signal OSC and the pumping capacity of the pumping voltage generation unit 235.

Next, the operation of the pumping voltage generation circuit 200 when the pumping voltage VPP rises above the target level (OP) is described below.

Referring to FIG. 13, after the pumping voltage VPP drops below the target level, the pumping voltage VPP may rise above the target level due to an over-pumping operation. For example, when the load current IL surges and then diminishes, the pumping voltage generation block 230 may excessively generate the pumping charge. This is related to reaction speed of the comparison block 210 having a feedback loop. In this case, an over-shoot ripple may occur in the pumping voltage VPP, and the pumping voltage generation circuit 200 may remove the over-shoot ripple as follows.

The comparison block 210 may compare the pumping voltage VPP with the reference voltage VREF and generate the comparison signal COMP corresponding to the comparison result. To be specific, the division unit 211 may divide the pumping voltage VPP at the predetermined division ratio "α" to generate the division voltage VPP*α whose voltage level drops below the pumping voltage VPP, and the comparison unit 213 may compare the division voltage VPP*α with the reference voltage VREF to generate the comparison signal COMP.

Since the comparison unit 213 may be implemented as the class AB operational amplifier, the second operation current IN flowing in the comparison unit 213 may vary corresponding to the voltage difference between the division voltage VPP*α and the reference voltage VREF. For example, the second operation current IN may increase in proportion to the voltage difference between the division voltage VPP*α and the reference voltage VREF.

The second monitoring block 240 may generate the second monitoring signal VPULL_DN based on the second bias voltage VBN corresponding to the second operation current IN. For example, the pull-down mirroring unit MN1 may generate a pull-down mirroring current IMIRR4 by mirroring the second operation current IN based on the second bias voltage VBN, the fourth monitoring unit CS4 may generate the switching control signal CTRL corresponding to the pull-down mirroring current IMIRR4 by comparing the pull-down mirroring current IMIRR4 with a fourth set current IREF2, and the bias unit BC may generate the bias voltage corresponding to the fifth set current IREF2/N or the ground voltage VSS as the second monitoring signal VPULL_DN in response to the switching control signal CTRL. When the pull-down mirroring current IMIRR4 is less than the fourth set current IREF2, the switching control signal CTRL may have a logic level of "1". In this case, the second monitoring signal VPULL_DN may have a logic level of "0" and be disabled. For example, since the first switch SW1 may be short in response to the switching control signal CTRL and the second switch SW2 may be open in response to the inverted switching control signal CTRLB, the second monitoring signal VPULL_DN corresponding to the ground voltage VSS may be generated.

On the contrary, when the pull-down mirroring current IMIRR4 is greater than the fourth set current IREF2, the switching control signal CTRL may have a logic level of "0". In this case, the second monitoring signal VPULL_DN may have a logic level of "1" and be enabled. For example, since the first switch SW1 may be open in response to the switching control signal CTRL and the second switch SW2 may be short in response to the inverted switching control signal CTRLB, the bias voltage corresponding to the fifth set current IREF2/N may be generated as the second monitoring signal VPULL_DN.

The discharge block 250 may remove the over-shoot ripple occurring in the pumping voltage VPP as the discharge path is provided between the pumping voltage VPP terminal and the ground voltage VSS terminal in response to the second monitoring signal VPULL_DN. Since the discharge block 250 and the diode connected NMOS transistor MN2 of the second monitoring block 240 are coupled with each other to build a mirroring relationship therebetween, a discharge current corresponding to the fifth set current IREF2/N may sink through the discharge path. In other words, the fifth set current IREF2/N may restrict and optimize the amount of the discharge current. Therefore, the amount of the discharge current of the discharge block 250 is properly controlled, and the pumping voltage VPP may be prevented from dropping below the target level again when the over-shoot ripple is removed.

In accordance with an embodiment of the present invention, the pumping voltage generation circuit 200 may remove the ripple occurring in the pumping voltage VPP as the amount of the pumping charge is adaptively controlled based on the load current IL or the discharge path is provided. Particularly, as the load current IL is indirectly monitored based on the first operation current IP and the second operation current IN, monitoring accuracy may be improved because the pumping voltage generation circuit does not fall under the influence of the high-frequency noise component included in the pumping voltage VPP.

In accordance with the embodiments of the present invention, as a ripple occurring in an internal voltage is indirectly monitored, an internal voltage generation circuit may not be influenced by high-frequency noise included in the internal voltage. Therefore, as compared with a technology for directly monitoring the internal voltage, monitoring accuracy may be improved and the performance to remove the ripple may be also improved.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

What is claimed is:

1. An internal voltage generation circuit, comprising:
a comparison block configured to generate a comparison signal by comparing a pumping voltage with a reference voltage;
a first monitoring block configured to generate a first monitoring signal by monitoring a first operation current of the comparison block; and
an internal voltage generation block configured to control an amount of an internal current in response to the first monitoring signal, and generate the pumping voltage corresponding to the internal current in response to the comparison signal,
wherein the internal voltage generation block includes:
an oscillating signal generation unit operable in response to the comparison signal, and configured to generate an oscillating signal whose frequency varies according to the first monitoring signal; and
a pumping voltage generation unit configured to generate the pumping voltage according to the oscillating signal and the first monitoring signal,
wherein the pumping voltage generation unit includes:
a pumping capacity control unit configured to control a pumping capacity of the pumping voltage generation unit in response to the first monitoring signal; and
a pumping unit configured to generate the pumping voltage corresponding to the pumping capacity and a frequency of the oscillating signal.

2. The internal voltage generation circuit of claim 1, wherein the oscillating signal generation unit includes a digitally controlled oscillator (DCO).

3. The internal voltage generation circuit of claim 1, wherein the comparison block includes:
a division unit configured to generate a division voltage by dividing the internal voltage at a predetermined division ratio; and
a comparison unit configured to generate the comparison signal by comparing the division voltage with the reference voltage.

4. The internal voltage generation circuit of claim 3, wherein the comparison unit includes a class AB operational amplifier.

5. The internal voltage generation circuit of claim 1, wherein the first operation current includes a source current of the comparison block which varies according to a voltage difference between the internal voltage and the reference voltage.

6. The internal voltage generation circuit of claim 1, wherein the first monitoring block includes:
a pull-up mirroring unit configured to generate a pull-up mirroring current by mirroring the first operation current; and
a first monitoring unit configured to generate the first monitoring signal according to the pull-up mirroring current.

7. The internal voltage generation circuit of claim 1, further comprising:
a second monitoring block configured to generate a second monitoring signal by monitoring a second operation current of the comparison block; and
a discharge block configured to discharge the internal current according to the second monitoring signal.

8. The internal voltage generation circuit of claim 7, wherein the second operation current includes a sink current of the comparison block which varies according to the voltage difference between the internal voltage and the reference voltage.

9. The internal voltage generation circuit of claim 7, wherein the second monitoring block includes:
a pull-down mirroring unit configured to generate a pull-down mirroring current by mirroring the second operation current;
a second monitoring unit configured to generate a switching control signal according to the pull-down mirroring current; and
a bias unit configured to generate the second monitoring signal according to the switching control signal.

* * * * *